US007158939B2

(12) United States Patent
Goldstein (10) Patent No.: US 7,158,939 B2
(45) Date of Patent: Jan. 2, 2007

(54) METHOD AND SYSTEM FOR IMPROVED REPORTING OF ISSUED TRAVEL TICKETS

(75) Inventor: William Z. Goldstein, Beltsville, MD (US)

(73) Assignee: Hadera, L.L.C., Baltimore, MD (US)

( * ) Notice: Subject to any disclaimer, the term of this patent is extended or adjusted under 35 U.S.C. 154(b) by 320 days.

(21) Appl. No.: 10/300,895

(22) Filed: Nov. 21, 2002

(65) Prior Publication Data

US 2003/0229523 A1   Dec. 11, 2003

Related U.S. Application Data

(60) Provisional application No. 60/386,579, filed on Jun. 7, 2002.

(51) Int. Cl.
*G06Q 10/00* (2006.01)
(52) U.S. Cl. .................................................. 705/5
(58) Field of Classification Search .................. 705/5, 705/6
See application file for complete search history.

(56) References Cited

U.S. PATENT DOCUMENTS

| 5,237,499 A | 8/1993 | Garback |
| 5,253,166 A | 10/1993 | Dettelbach et al. |
| 5,764,981 A | 6/1998 | Brice et al. |
| 6,023,679 A | 2/2000 | Acebo et al. |
| 6,122,642 A | 9/2000 | Mehovic |

FOREIGN PATENT DOCUMENTS

WO   WO 98/29840   *   7/1998

OTHER PUBLICATIONS

No author; IATA To Fuse Back-Office Functions of 60 BSP Sites; Aug. 26, 1998; Inside IT vol. 2, No. 17; p. 5; dialog copy 1 page.*
Cogswell, David; ARC Automates Agents; Dec. 15, 1997; Travel Agent, p. 81; dialog copy 3 pages.*
No author; Brunei: Travel Agencies inside out; Jul. 14, 2001; Borneo Bulletin; dialog copy 2 pages.*
DialogWeb, Quinby, Douglas Leisure Travel News, v 17, n 11 Monday, Mar. 19, 2001.
Industry Agents' Handbook, Section 8.6, pp. 1-3 (rev. Jan. 2002).
Industry Agents' Handbook, Section 10, pp. 2-8 (rev. Jan. 2002).
Travel Weekly Magazine: Nov. 26, 2002, Agents to ARC: Void daily reporting plan.
Travel Weekly Magazine: Nov. 26, 2003, ARC head makes case for daily reporting.
Travel Weekly Nov. 25, 2002, ARC laying plans for daily sales reporting.

* cited by examiner

*Primary Examiner*—Thomas A. Dixon
(74) *Attorney, Agent, or Firm*—Finnegan, Henderson, Farabow, Garrett & Dunner, L.L.P.

(57) ABSTRACT

A method and system that enables airlines to collect revenue when customers seek to exchange an existing ticket for a new ticket on a given airline or other travel provider. In one embodiment, the reporting of ticket sales is performed in real-time, and therefore, the travel agent facilitates collection of an airline-imposed change fee from the customer each time exchange of the existing ticket for a new ticket is required. Alternatively, the airlines may charge a void fee and permit the travel agent to void the existing airline ticket when real-time reporting of sales is performed. In another alternative embodiment, the travel agent may not be allowed to void the ticket.

4 Claims, 11 Drawing Sheets

FIGURE 1

RELATED ART

FIGURE 2

RELATED ART

FIGURE 3

RELATED ART

METHOD AND SYSTEM FOR IMPROVED REPORTING OF ISSUED TRAVEL TICKETS

This application claims benefit of Provisional Application No. 60/386,579 filed Jun. 7, 2002; the disclosure of which is incorporated herein by reference.

BACKGROUND OF THE INVENTION

1. Field of the Invention

The present invention relates to a method and a system for improving the efficiency of issuing tickets and, more specifically, a method and system for issuing non-refundable tickets for a customer wishing to exchange his or her existing ticket for a new ticket.

2. Background

Travel agencies have been and are the prime distribution outlets for airline tickets. Currently, travel agencies distribute approximately 70% of all airline tickets sales in the United States. In calendar year 2000, travel agencies made approximately $80 billion in gross sales from issuing over 195 million airline tickets. In the calendar year 2001, travel agencies issued approximately $70 billion in airline tickets, with the decrease largely due to the terrorist attacks of Sep. 11, 2001.

There are two different types of airline tickets issued in the airline industry: fully refundable tickets and non-refundable tickets. Travel agencies, on behalf of their clients, may refund fully-refundable tickets without any airline fee imposed. This is not the case for non-refundable tickets, however. Instead, the same passenger can use non-refundable tickets for future travel on the same airline, but airlines currently charge a change fee of about $100 to change such tickets.

Travel agencies issue airline tickets and report sales of tickets and remit payments on a weekly reporting cycle (e.g., Mon–Sun) to the Airline Reporting Corporation ("ARC"), a company that is wholly-owned by the member airlines. ARC was organized by the airlines for the sole purpose of controlling, regulating, and administering travel agency sales of their product. ARC operates to ensure that all ticket sales are properly reported and paid for by the approximately 24,000 travel agencies in the United States. Currently, travel agencies submit their reports and remit payments to ARC either manually or electronically using Interactive Agency Reporting ("IAR").

ARC is the successor to ATA's (Air Traffic Association of America's) Air Traffic Conference and the administrators of the Standard Ticket and Area Settlement Plan, and continues to service the travel industry in accordance with the structure and principles first established in 1964 with the creation of the Area Settlement Plan. ARC seeks to be the preferred provider of high quality, technologically-advanced services related primarily to distribution and settlement of travel purchased in the United States on behalf of ARC's owner airlines, participating carriers, authorized travel agencies, and customers in the most secure, cost effective, and innovative manner. Historically, ARC traffic documents, or tickets have been the key to establishing the relationship among carriers, travel agents, and the public. The standardized ticket has provided a simple and efficient means for agents to sell travel on all participating carriers. Beginning in early 1995, ARC began to process and settle E-tickets (electronic tickets) issued by ARC-accredited travel agents through Computer Reservations Systems ("CRSs"), now also known as Global Reservations Systems ("GDSs"). The treatment accorded an electronic transaction by ARC is, for the most part, a mirror image of the function performed for the paper ticket, with accountability residing with the electronic record of a document number rather than a numbered paper document. E-tickets currently account for about half of all ARC-processed travel agent transactions, and their popularity is still rising.

ARC's most ambitious processing advancement was the January 1997 of IAR InteractivePlus. Travel agents electing to participate in IAR are able to complete their weekly sales reporting and settlement with ARC through electronic means rather than printing, mailing, and balancing a manual sales report. This electronic interaction is accomplished through links between agents, their Computer Reservation Systems (CRS) or a more recently introduced Internet link. ARC nightly downloads of sales information are edited through ARC's IAR system, and credit card transactions are released for electronic billing. Travel agents receive daily confirmations of edited sales information, permitting the agents to release a fully edited sales report to ARC at the conclusion of the sales week. Because the travel agent does not release the report until the end of the sales week, however, a travel agent may void a ticket sale at no airline-fee cost to the passenger because the ARC or airlines will not know the ticket ever issued.

As agent use of the IAR system expands, significant benefits and savings are expected for agents, ARC, and participating carriers. However, the related art method illustrated in FIG. 1 is still practiced, so that travel agents may void tickets at the customer's request prior to the end of the current reporting period (i.e., one week).

Certain basic ticketing principles apply regardless of whether an airline ticket is issued manually or electronically, or is reported through IAR. Each time a travel agent issues a ticket or performs an electronic ticket transaction, the name of a validating carrier is designated on the transaction. ARC's processing centers can then identify the airline or travel agent to receive funds or commission for that ticket. Each week, every participating carrier receives one payment from ARC for all transportation sold for that carrier by every ARC agent in the United States, Puerto Rico, and the U.S. Virgin Islands. This makes it difficult to have a reporting period shorter than one week.

Any airline is eligible to use ARC's services upon signing a Carrier Services Agreement and meeting the requirements contained therein. At the end of the second quarter of 2001, ARC had 37,317 accredited travel agency locations (travel agent retail and satellite ticket printer (STP) locations), 91 ARC accredited corporate travel departments (CTD), 134 participating air carriers, and 3 participating railroads.

Figure 1:
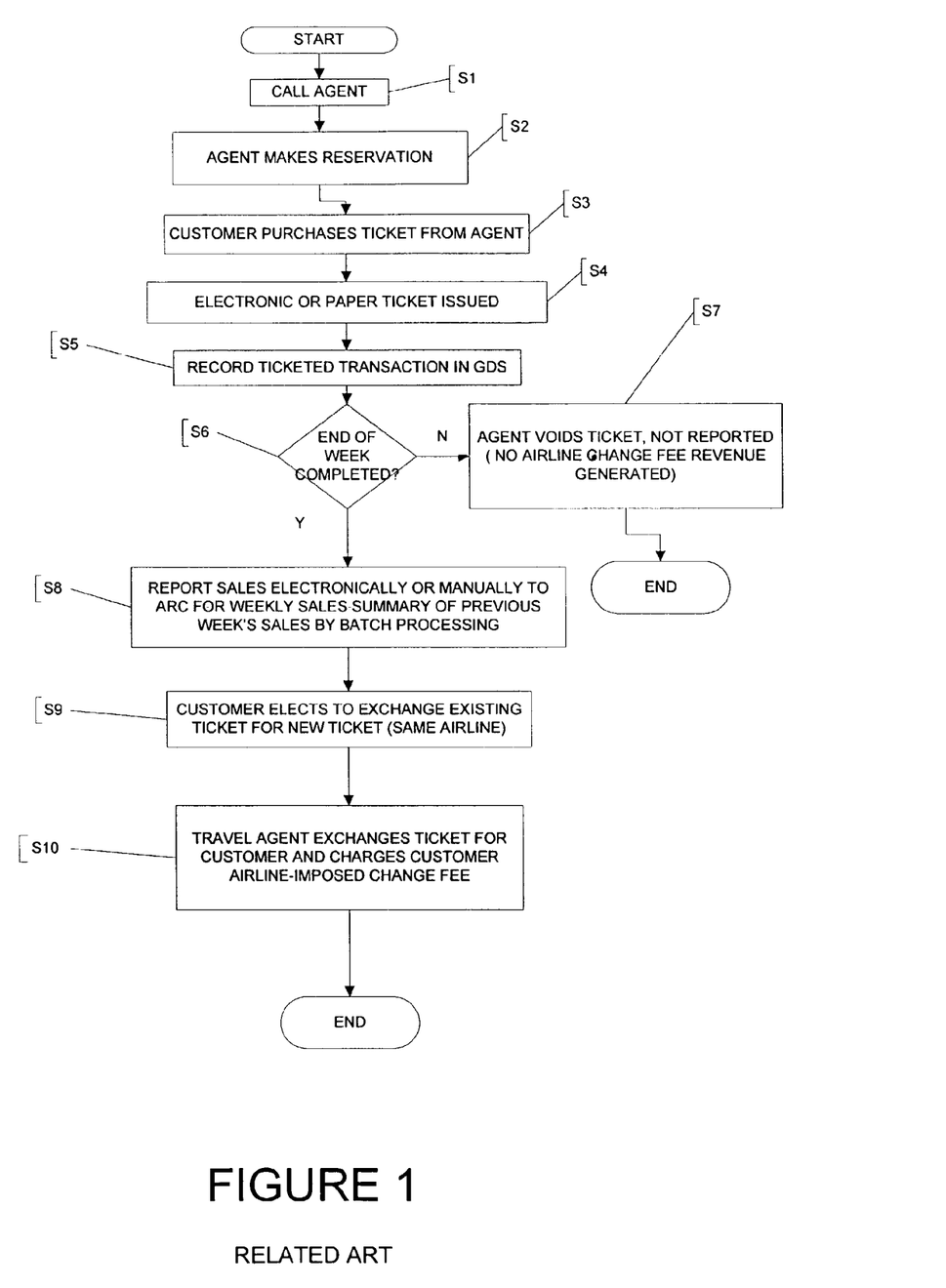
FIG. 1 illustrates a conventional method of issuing an airline ticket.

FIG. 1 illustrates a conventional process of issuing a ticketing transaction involving a client wishing to change or cancel travel on a nonrefundable issued ticket. First, a customer calls a travel agent to purchase a ticket for air travel. (Step S1) Next, the agent makes a reservation for the customer. (Step S2) The customer then purchases the ticket from the agent (Step S3), and a paper or electronic ticket is issued to the purchaser. (Step S4)

The ticketed transaction is recorded in the GDS only for validating the reservation. (Step S5) Reporting cannot occur at this stage due to the format and information collected by the GDS, so airlines are not informed of the sale at the time of the sale.

If the end of the weekly reporting cycle has not been reached (Step S6), then the agent may void the ticket (Step S7) and the original sale of the ticket to the airline is never reported to the airline. Since the airline carrier was never aware of the sale, it cannot charge a change fee, resulting in a tremendous loss of potential revenue for the airlines.

If, however, the weekly reporting cycle has been reached (Step S6), then the travel agent reports sales, either electronically or manually, to ARC for the weekly sales summary of the sales generated during the previous week. (Step S8) This report is generated in batch on a weekly basis. Currently, reports are only generated in a weekly batch process, because of the requirements of small travel agents and the current process.

If a customer elects to change travel plans( e.g., cancel the trip, change dates of travel, etc.) the weekly sales report is generated (Step S9) at step S9, a customer may elect to exchange the existing ticket for a new ticket on the same airline. Then the travel agent performs the desired change and charges the customer the airline-imposed change fee. (Step S10) The process is then completed.

Figure 2:
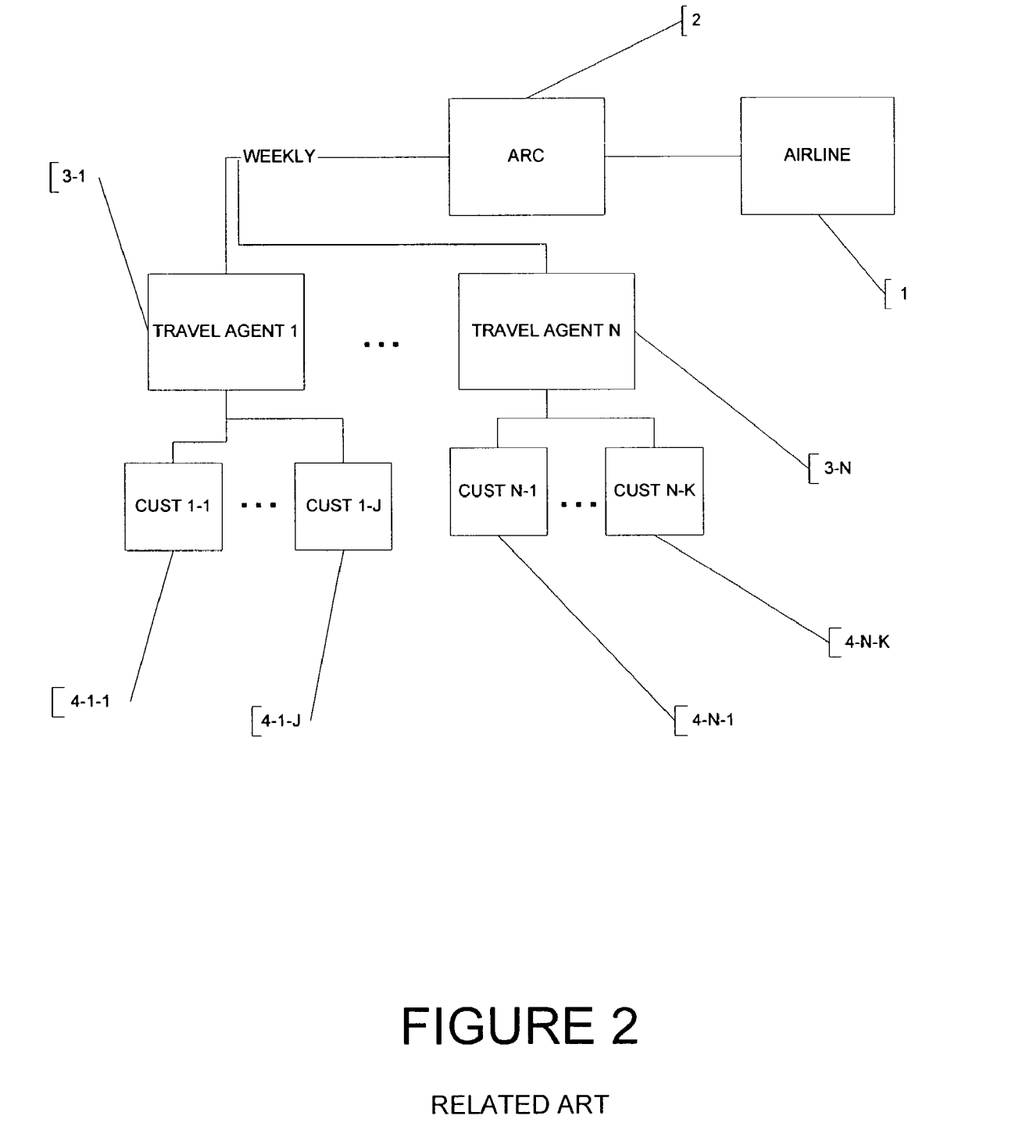
FIG. 2 illustrates a conventional system for performing an airline ticket transaction.

FIG. 2 illustrates a conventional system for performing an airline ticket transaction. This related art system comprises travel agents 3-1 ... 3-N, one or more of which issue a ticket in response to a request by a customer (e.g., one of 4-1-1 ... 4-1-J). ARC 2 is interposed between the travel agents 3-1 ... 3-N and the airline 1. The travel agents 3-1 ... 3-N report sales to ARC 2 in a batch format on a weekly basis. Under this system, the travel agents 3-1 ... 3-N are able to void the ticket if the end of the weekly reporting cycle has not been reached. Therefore, this system also permits tremendous loss of revenue to the airlines due to voided or changed tickets.

Figure 3:
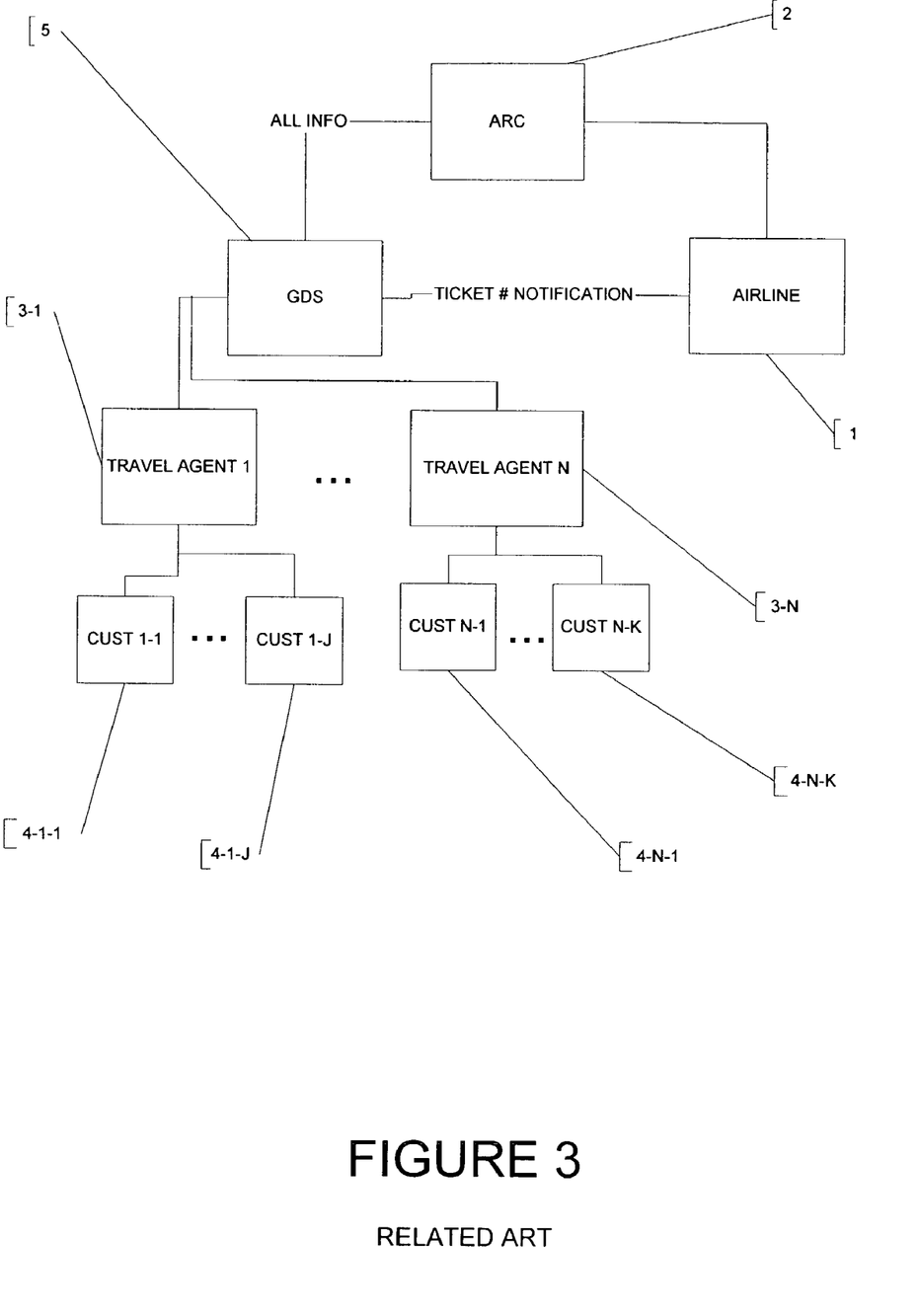
FIG. 3 illustrates a conventional monitoring and enforcement system

FIG. 3 illustrates a conventional monitoring and enforcement system. The travel agents 3-1 ... 3-N and the customers for each of the travel agents are situated substantially as in FIG. 2, but when the ticket sale is made, information on the ticket sale is reported to the GDS 5. The GDS 5 then reports all information on the ticket sale that is provided by the travel agent (e.g., 3-1) to ARC 2, and provides the airline 1 with a ticket number notification. Therefore, the airline does not receive any other sales information until the travel agent provides ARC 2 with the aforementioned weekly sales report, which is correspondingly submitted to the airline 1.

As a result, if customer 4-1-1 is issued a ticket by travel agent 3-1 and the sale is not reported to the airline 1 by ARC 2, the airline 1 does not become aware of the sale until it is discovered after the customer 4-1-1 has submitted the ticket to the airlines at the gate, and the ticket has been submitted to an accounting department of the airline 1. This pertains to situations where the ticket is issued and used before the weekly cycle ends. Thus, the airline 1 experiences a significant delay in collecting unreported ticket sales, due to the limited aforementioned monitoring and enforcement system, and as illustrated in FIG. 3.

SUMMARY OF THE INVENTION

A method consistent with the present invention relates to transmitting a report of a ticket sale from a travel agent to an intermediate agent at a prescribed rate and imposing a fee for exchanging the ticket if, after the report has been sent, the customer determines that the ticket is unacceptable. The reporting of this method is performed by a travel agent that interacts electronically with the customer via a communication device. The intermediate agent is interposed between the travel agent and the airline, which imposes the change fee.

Another method consistent with the present invention relates to electronically transmitting a report of a sale of a ticket, to for example an intermediate agent, simultaneously with the sale, and one of an airline and the intermediate agent collecting a penalty from the travel agent if the ticket is unacceptable to the customer. Alternately, the report may be transmitted directly to an airline.

A third method consistent with the present invention relates to voiding a travel ticket issued to a customer if a prescribed period has not expired from the time of the sale of the travel ticket to the customer and the customer wishes to change the ticket. The voiding is then reported, to for example, one of an intermediary agent and an airline and a void fee is collected.

A system consistent with the present invention may be used by a travel agent that issues a ticket in response to a request received from a customer, an intermediate agent that receives a sales report generated by the travel agent at a prescribed rate prior to a determination of acceptance of the ticket by the customer, and an airline that receives a fee if the customer exchanges the ticket for another ticket. A fee is also collected by one of the intermediate agent and the airline.

According to another system consistent with the present invention, the intermediate agent receives a sales report generated by the travel agent at a prescribed rate, and the airline receives a void report from the travel agent if the ticket is voided and collects a void fee from the travel agent.

According to a third system consistent with the present invention, the airline directly receives a sales report from the travel agent at a prescribed rate and receives a fee if the travel ticket is changed or voided.

To achieve at least the foregoing aspects, the present invention is provided.

BRIEF DESCRIPTION OF THE DRAWINGS

The accompanying drawings, which are included to provide a further understanding of illustrative, non-limiting embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the illustrative, non-limiting embodiments of the present invention, examples of which are illustrated in the accompanying drawings. The terms are meant to have the definition provided in the specification, and are otherwise not limited by the specification. Further advantages of these and the stated objects reside in the details of construction and operation as more fully hereinafter described and claimed, reference being made to the accompanying drawings forming a part hereof, wherein like numerals refer to like parts throughout.

Systems and methods consistent with present invention provide several advantages over conventional systems. For example, but not by way of limitation, the travel agent may be prevented from voiding or otherwise changing a ticket based on a customer request free of charge (e.g., changing/voiding without the airline's knowledge), and would instead be forced to exchange the ticket in a manner that requires payment of an airline-imposed change fee. Alternatively, if the travel agent is permitted to void the ticket on behalf of the customer, then the airline may issue a debit memo to the intermediary agent or the travel agent, or alternatively, a void/change fee may be collected for the airlines and reported to an intermediary agent. The intermediary agent could be ARC. The travel agent need not be physically present but could be remote (e.g., a web-based travel agent).

Since travel agencies have traditionally reported and remitted sales weekly, they have consistently offered their customers the courtesy of voiding airline tickets issued in a given week. By voiding airline tickets in this manner, travel agencies do not report the original sale to the airlines.

Travel agencies void or change approximately 10% of all airline tickets, or about 17–19 million tickets annually. Of all airline tickets issued annually, about 65% are non-refundable. Applying a $100 airline change fee to the approximately 11.5 million voided/changed non-refundable tickets annually represents lost new revenue of about $1.15 B to the airlines in the United States alone.

Further, a lost positive cash flow is created by allowing travel agencies to void or change issued airline tickets. If a nonrefundable airline ticket could not be voided or changed by the travel agencies without a change fee being charged (contrary to the conventional techniques), the airlines collectively could realize a net cash flow gain of over $ 12 B annually.

Figure 4:
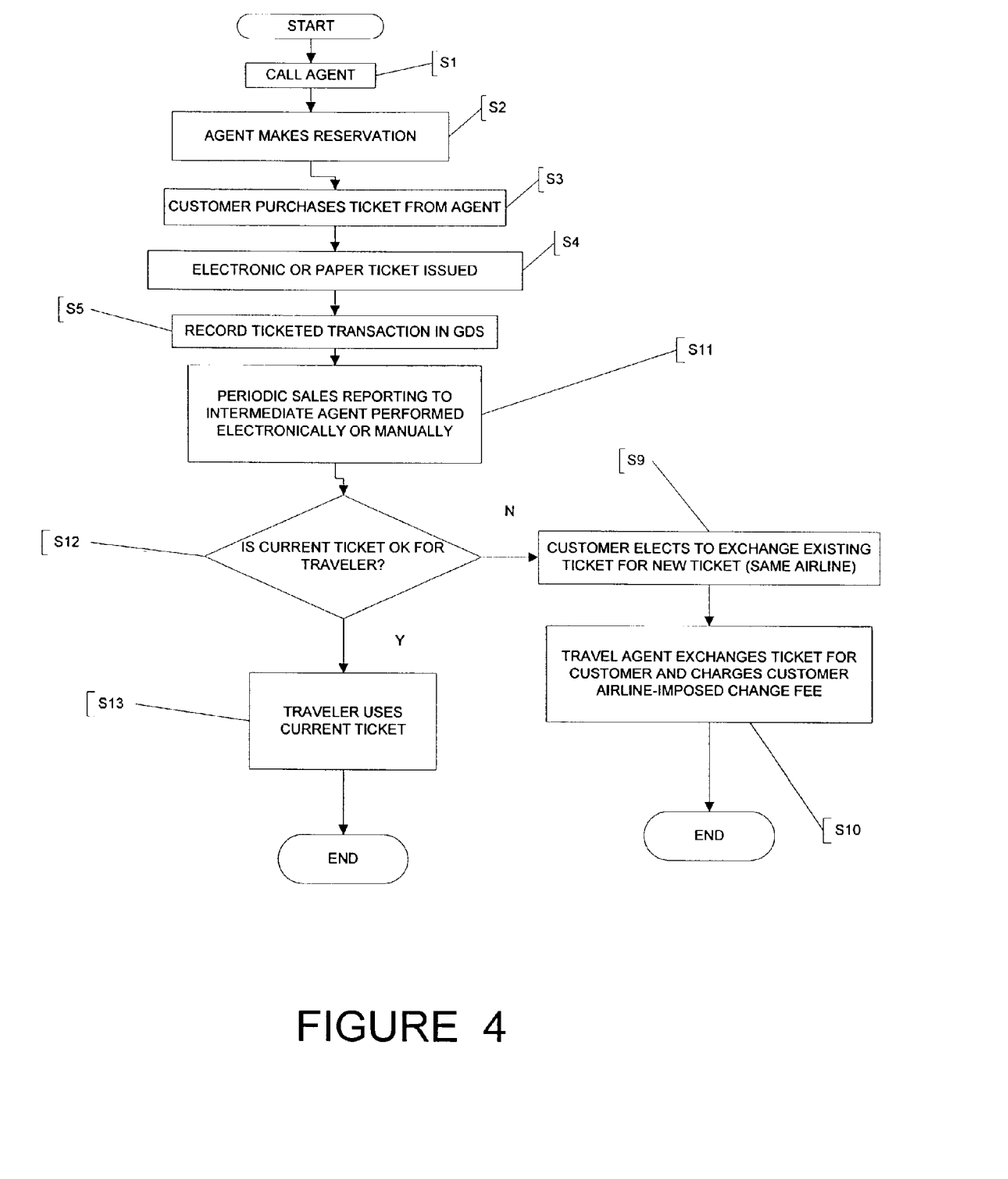
FIG. 4 illustrates a method consistent with the present invention.
Figure 5:
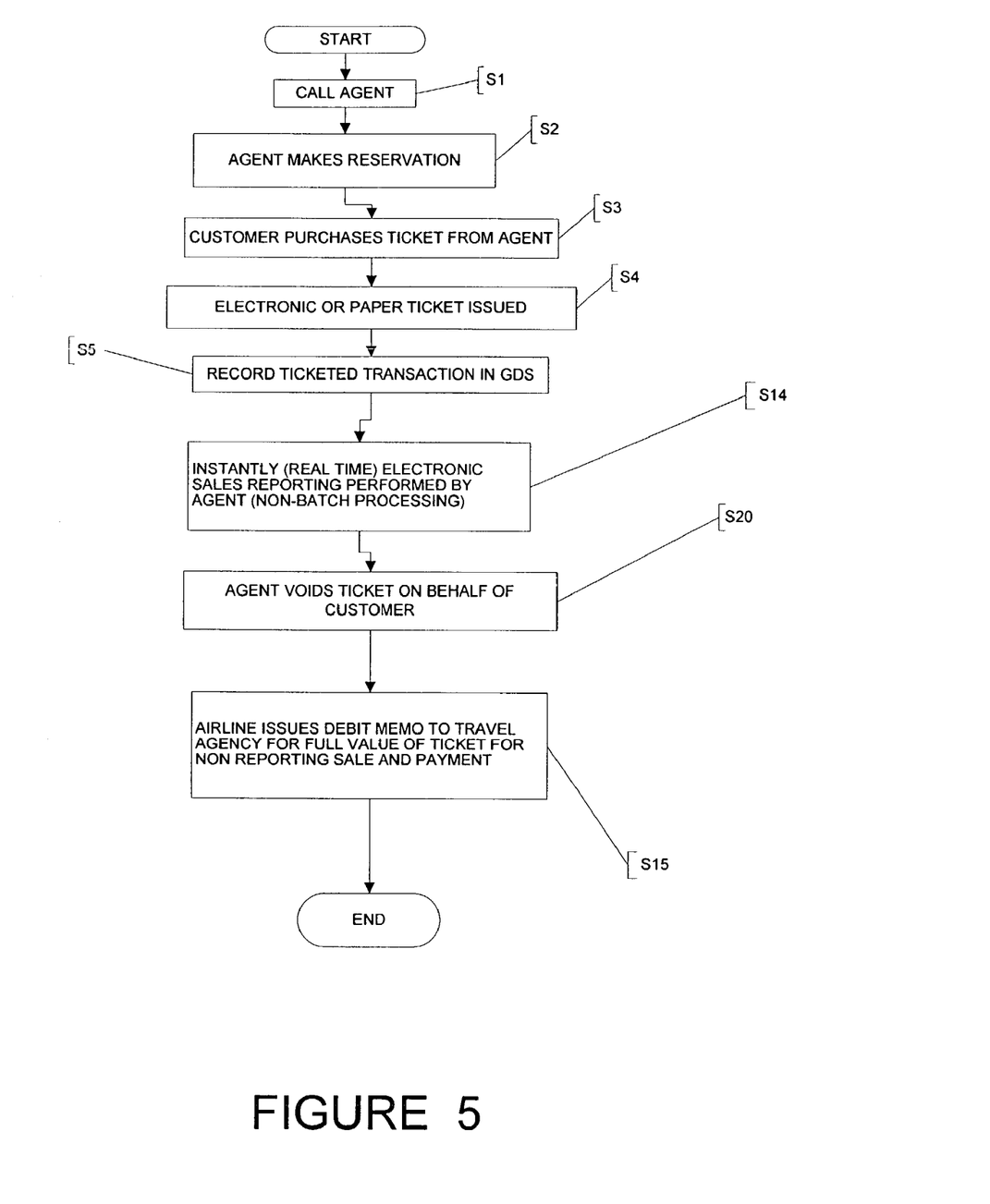
FIG. 5 illustrates a second method consistent with the present invention.
Figure 6:
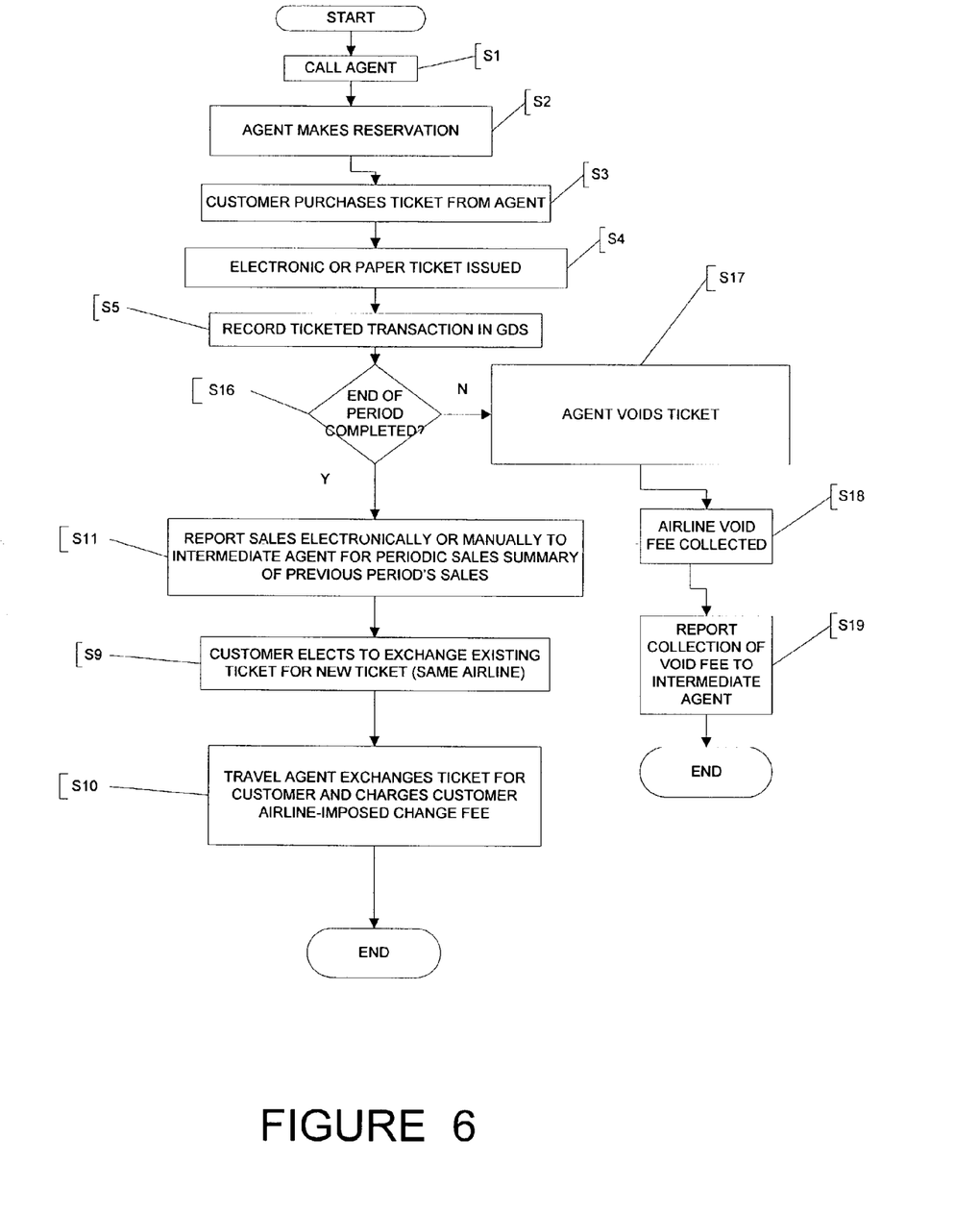
FIG. 6 illustrates a third method consistent with the present invention.

FIGS. 4–6 illustrate various systems consistent with the present invention. FIG. 4 illustrates a method of reporting periodic sales reporting to an intermediary agent, with the travel agent not permitted to void or otherwise change a ticket. In FIG. 4, steps S1–S5 are performed as in FIG. 1.

After recording the transaction (Step S5) periodic sales reporting is performed electronically or manually. (Step S11) For example, but not by way of limitation, the sales may be reported electronically or manually, and the period of reporting may be fixed (e.g., hourly or daily) or variable (e.g., random, or otherwise varied based on a parameter such as network traffic and usage, and/or processing resource availability).

If the current ticket is acceptable to the traveler (Step S12), then the traveler uses the current ticket. (Step S13) However, if the ticket is not acceptable for the traveler, then the traveler changes the ticket (Step S9) and the travel agent effects the change and charges the appropriate fee (Step S10) as in FIG. 1.

Instead of the travel agent charging a fee, the airline may issue a debit memo to the travel agency. For example, the issuing of the debit memo may be electronically generated or transmitted. As a result, the travel agent may not void the airline ticket, and the periodic reporting is performed.

FIG. 5 illustrates another non-limiting exemplary embodiment of the present invention, in which real-time reporting is performed. In FIG. 3, steps S1–S5 are performed as in FIG. 1, and are not repeated herein.

After recording the transaction (Step S5), the travel agent performs instant (i.e., real-time) electronic reporting of sales is performed by the travel agent. (Step S14) The reporting is performed to an intermediary agent or alternatively, to the airline directly. For example, the intermediary agent could be ARC. Unlike the conventional method, the method in FIG. 3 reports in a non-batch manner.

If a travel agent may need to void or otherwise change a ticket on behalf of a passenger, after the reporting has been completed (Step S20), then the airline issues a penalty to the travel agency. (Step S15) The penalty may be in the form of a debit memo for the full value of the ticket, for the non-reporting of the sale and for payment, or in the form of an airline- or intermediary agent-imposed fee. Additionally, the penalty may be electronically generated or electronically transmitted for payment by the travel agency.

FIG. 6 illustrates yet another system consistent with the present invention. Steps S1–S5 are performed as in FIG. 1. After recording the transaction (Step S5) the reporting period has been completed (Step S16), if the reporting period has been completed, then steps S11, S9, and S10 are performed as described above with respect to FIG. 2.

However, if the reporting period has not been completed (Step 16), then the agent voids or otherwise changes the ticket. (Step S17). The agent collects an airline void/change fee from the customer for the airline. (Step S18). Then, the collection of the fee is reported to the intermediary agent. (Step S19). The fee may be electronically collected.

The steps of issuing debit memos and void fees in the methods described above may be performed by the airlines working through the intermediary agent. The intermediary agent may charge a fee on a per ticket basis. For example, the intermediary agent could issue the debit penalty (Step S15) of the method illustrated in FIG. 5, and charge a fee that may be passed on to the travel agency.

While the steps are described in the FIGS. 4–6 as numbered above, the numbering of the steps is not intended to indicate a required sequential order. The steps may be performed in any appropriate order and could be performed electronically via communications devices (e.g., computer, portable or mobile telecommunications device, or the like).

The steps of the foregoing method may also be implemented in a computer-readable medium, and may include multiple nodes capable of receiving and transmitting at various of the aforementioned steps. For example, systems consistent with the present invention may include a network with nodes connected by wireless or wireline communication. Further, systems consistent with the present invention may be implemented via the Internet, an intranet, or other data communication structure as would be understood by one of ordinary skill in the art.

Figure 7:
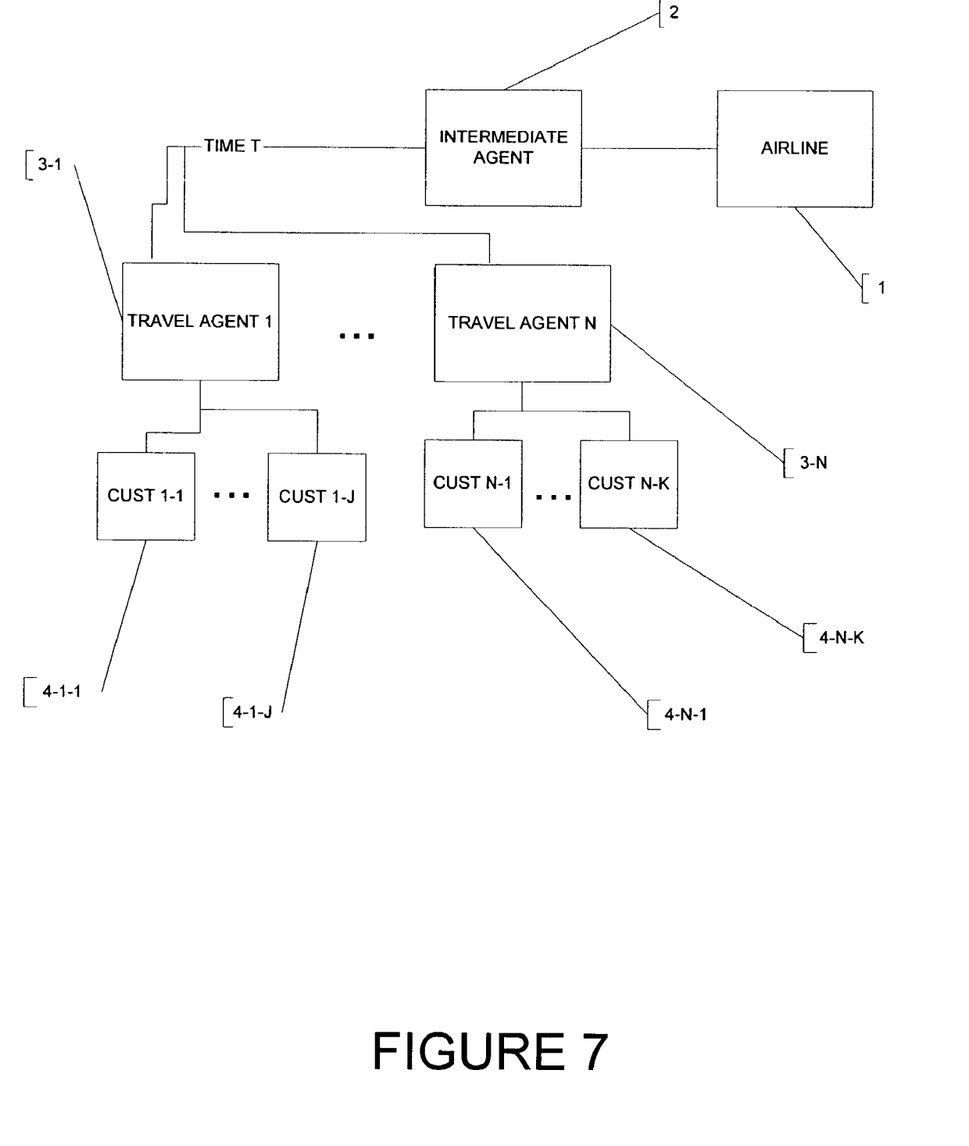
FIG. 7 illustrates a system consistent with the present invention.
Figure 8:
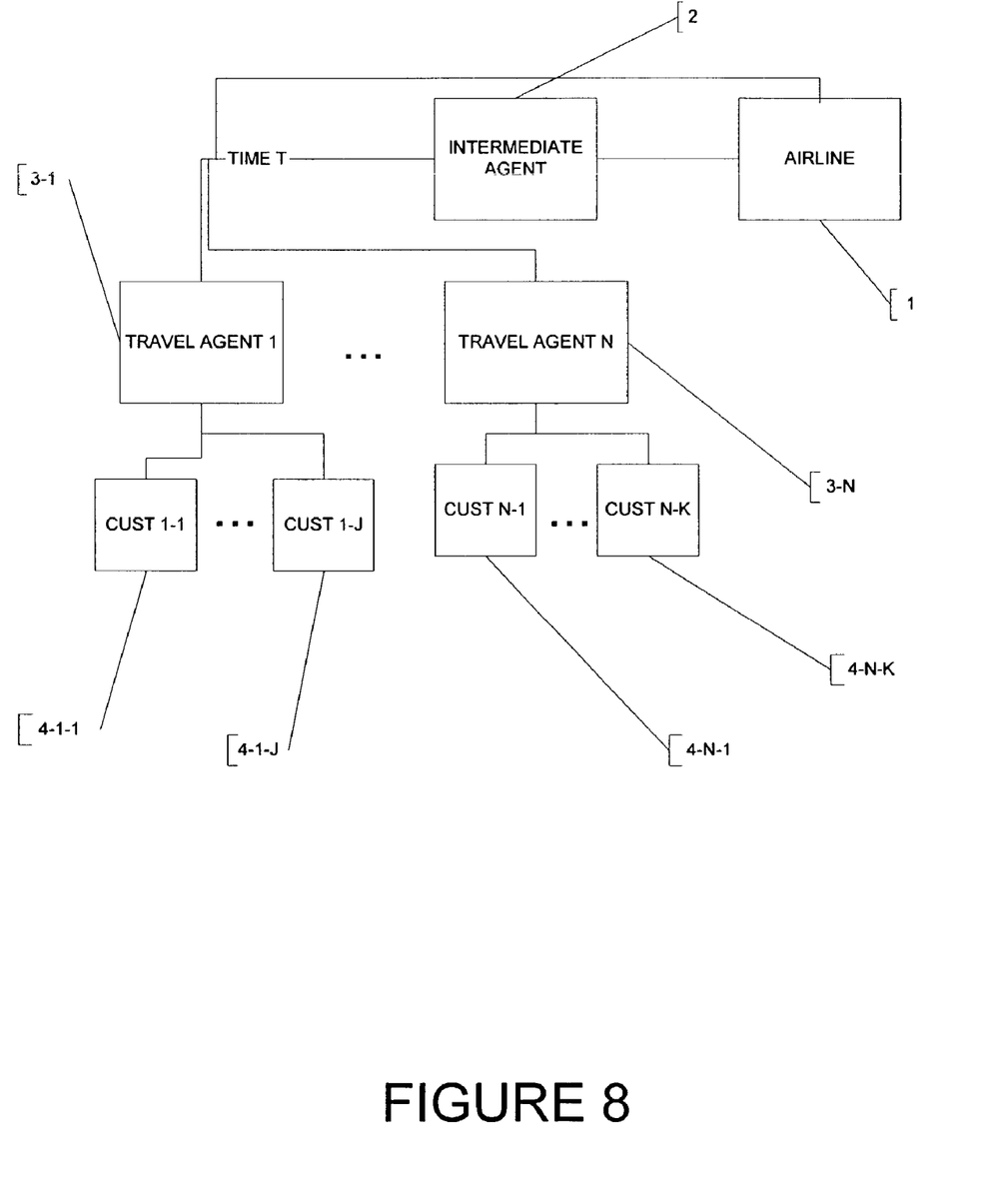
FIG. 8 illustrates a second system consistent with the present invention.
Figure 9:
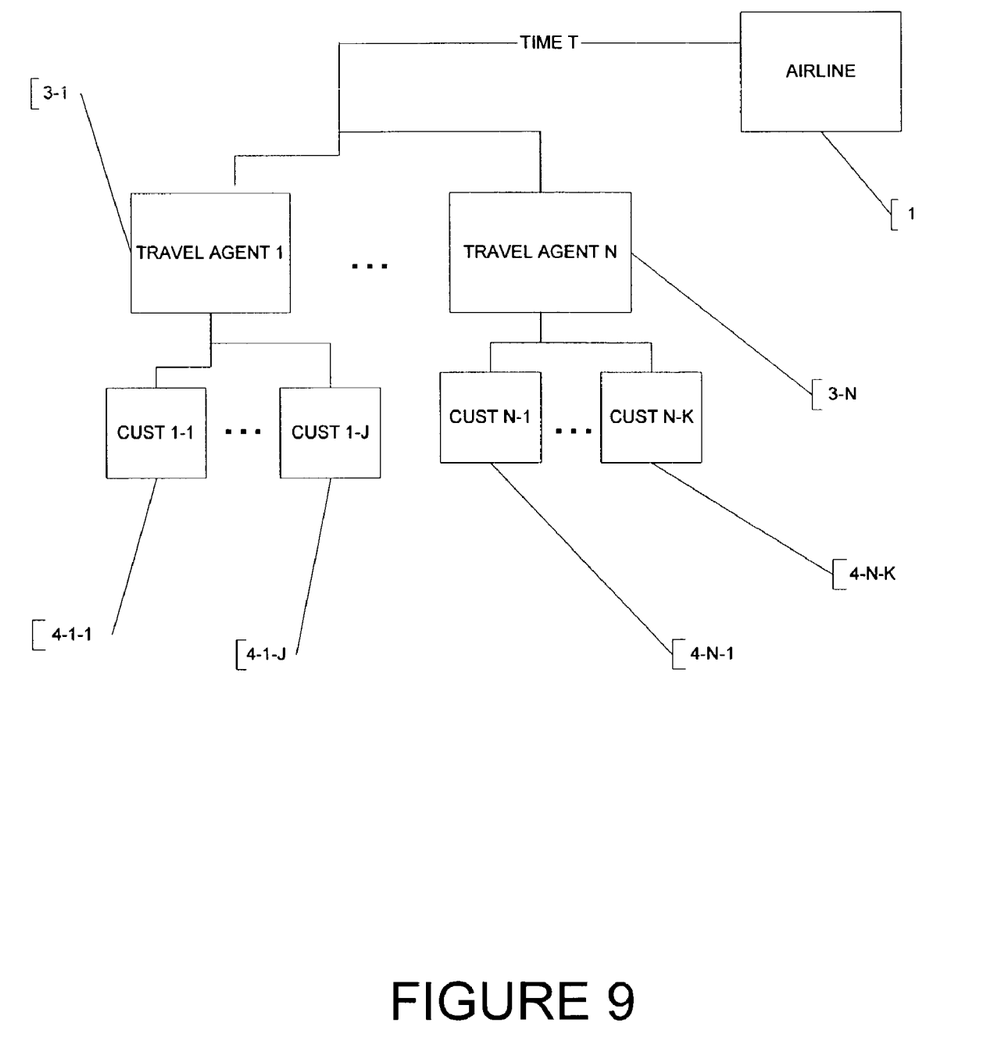
FIG. 9 illustrates a third system consistent with the present invention.

FIGS. 7–9 illustrate various embodiments of the system of the present invention. FIG. 7 illustrates a system consistent with the present invention that comprises travel agents 3-1 . . . 3-N, one or more of which issue a ticket in response to a request received from one of the customers (e.g., 4-1-1 . . . 4-1-J). For example, any of travel agents 3-1 . . . 3-N could be web-based travel agents. An intermediate agent 2, such as ARC, is interposed between the travel agents and an airline 1. The intermediary agent 2 receives a sales report from at least one of the travel agents 3-1 ... 3-N at a prescribed rate, according to a time T, prior to a determination of acceptance of the ticket by the customer. The travel agents 3-1 ... 3-N are not permitted to void or change travel tickets in this embodiment as in the conventional systems. Therefore, airline 1 receives a fee if the customer determines that an issued ticket is unacceptable and a void/change is effected. This fee may be collected (e.g., electronically) by the intermediary agent 2 or directly by the airline 1, as described in greater detail herein.

The time T could approach zero if the airline receives a sales report simultaneously with the issuing of the ticket (i.e., in real-time). Various factors may of course affect the prescribed time T discussed in each embodiment, for example network traffic or the volume of issued tickets.

FIG. 8 illustrates another system consistent with the present invention. As noted above, travel agents 3-1 ... 3-N are agents that issue travel tickets in accordance with a request from a customer (e.g., 4-1-1 ... 4-1-J). In FIG. 9, intermediate agent 2 is interposed between the travel agent and an airline 1, and 2 receives sales reports from at least one of the travel agents 3-1 ... 3-N on a periodic basis according to a time T. If the customer determines that the ticket is unacceptable, and if the prescribed time T has not passed, airline 1 receives a void report from the travel agent (e.g., electronically) and collects a void fee without requiring participation of the intermediary agent 2. According to one aspect of this system, the prescribed time T approaches zero, such that the airline receives a sales report simultaneously with the issuance of the ticket (i.e., in real-time). According to another aspect of this embodiment, the prescribed time T depends on network traffic or on the volume of issued tickets.

FIG. 9 illustrates a further system consistent with the present invention. According to this system, there is no intermediate agent. One of travel agents 3-1 ... 3-N issues a ticket according to a request from a customer (e.g., at least one of 4-1-1 ... 4-1-J). An airline 1 receives a sales report from one of the travel agents 3-1 ... 3-N at a prescribed rate (i.e., once every time T), and the airline 1 collects a fee (e.g., electronically) if the ticket is subsequently changed or voided. The time T approaches zero if airline 1 receives a sales report simultaneously with the issuance of the ticket. According to another aspect of this embodiment, the time T depends on network traffic. According to a further aspect of this embodiment, the time T depends on the volume of issued tickets.

Figure 10:
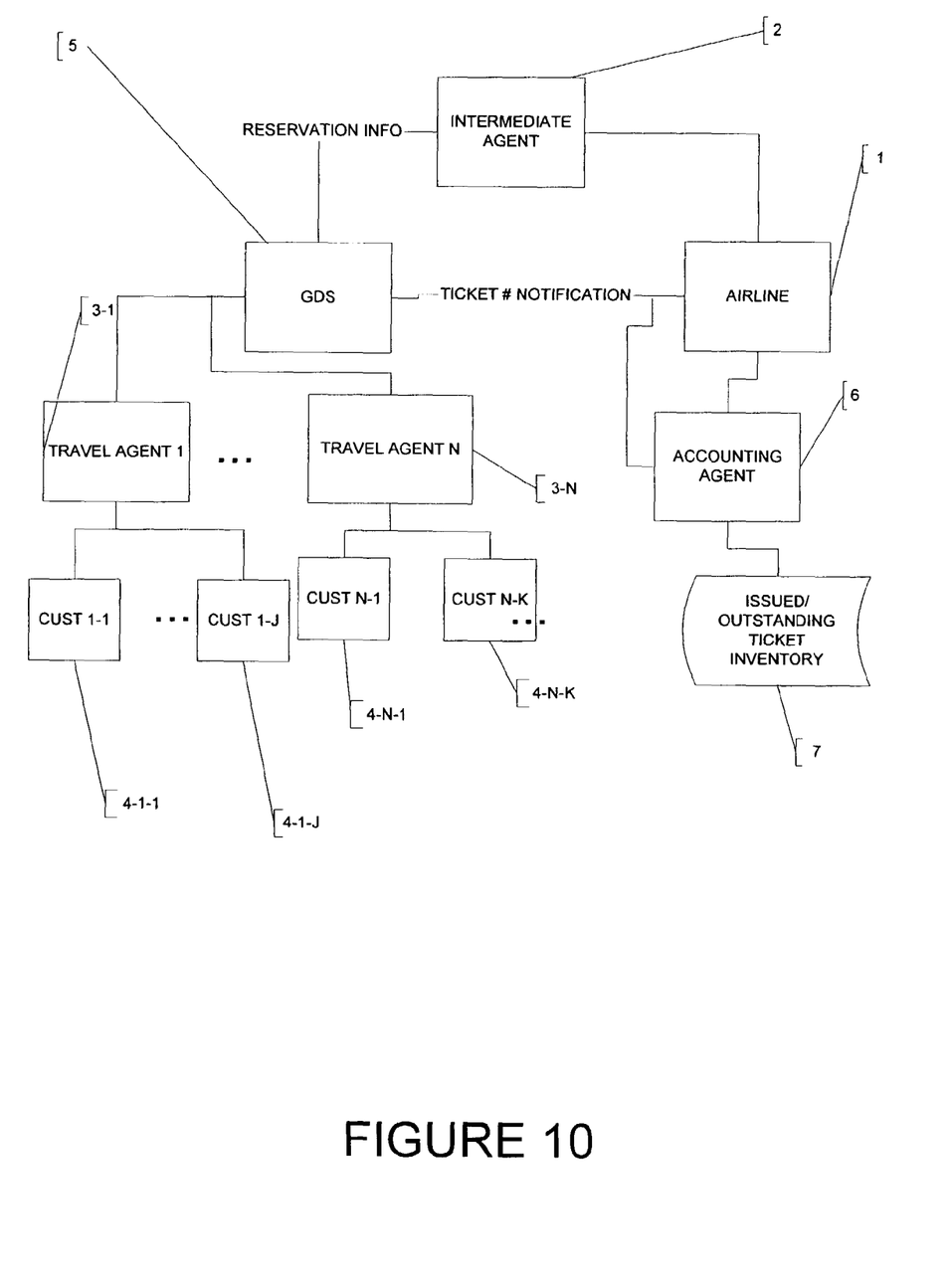
FIG. 10 illustrates a monitoring and enforcement system consistent with the present invention.

FIG. 10 illustrates an exemplary monitoring and enforcement system for use in connection with the methods and systems described in this specification. As is the case in FIGS. 2 and 3, travel agents 3-1 ... 3-N provide the GDS 5 with information on ticket sales. Additionally, when the GDS 5 provides immediate ticket number notification to the airline 1, that information is also submitted to an accounting agent 6. The accounting agent 6 stores the ticket number information in an issued/outstanding ticket inventory 7 (e.g., a database). Once the airline 1 is paid by ARC 2, the airline 1 provides information to the accounting agent 6 so that the inventory 7 may be updated.

As a result, the accounting agent can generate a list of outstanding unpaid tickets at any time, and the airline 1 does not need to wait for its accounting office to receive a ticket that was collected at the gate (i.e., after travel was completed but before the travel agent submitted payment) before attempting to collect on the unpaid ticket. As a result, the airline 1 can determine which tickets remain unpaid and, for example, require payment from the agent prior to the ticket actually being used by the customer (e.g., 4-1-1).

Figure 11:
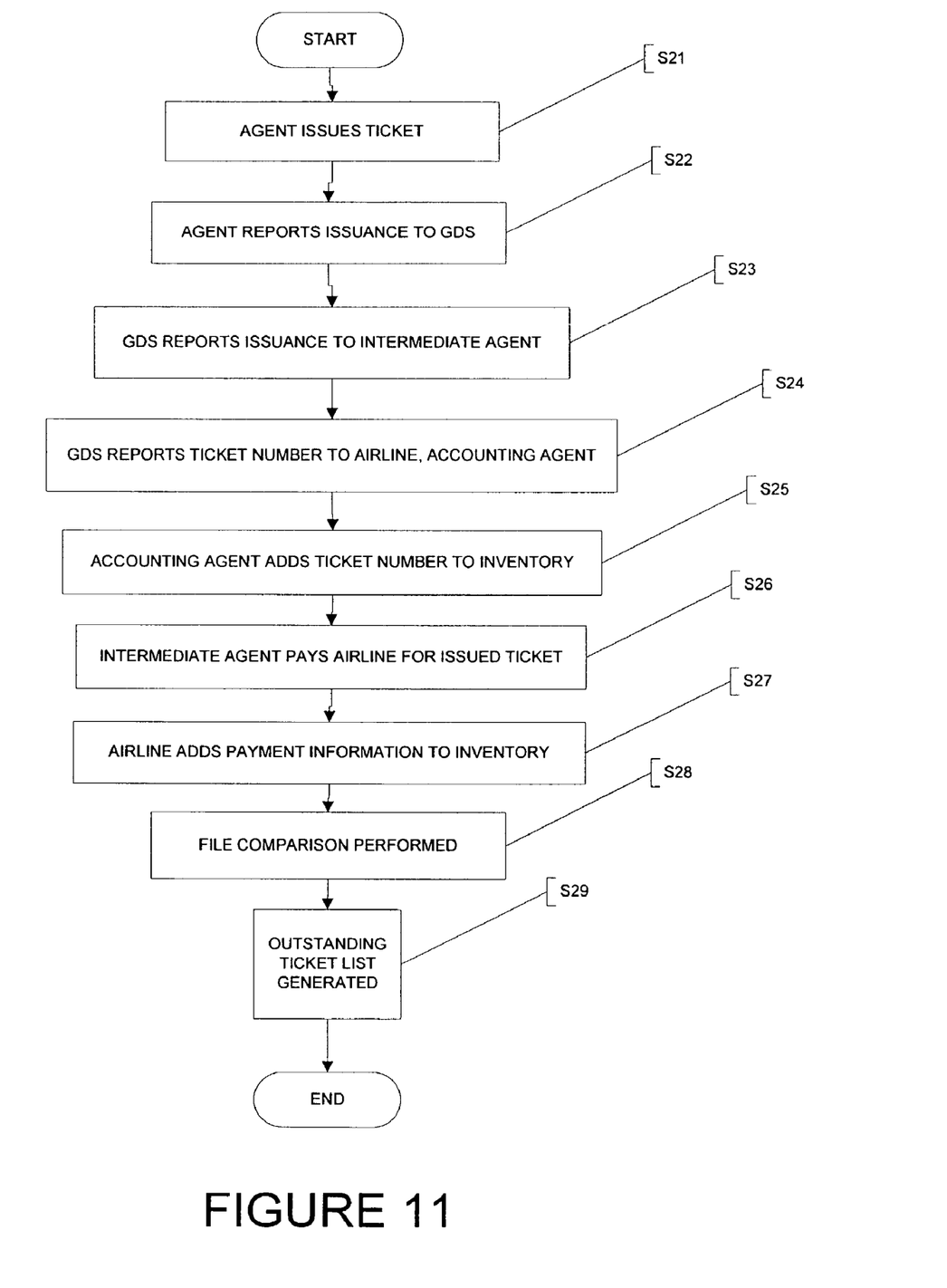
FIG. 11 illustrates a monitoring and enforcement process consistent with the present invention.

FIG. 11 illustrates an exemplary depiction of a scheme for enforcing and monitoring of ticket issuance consistent with the present invention. Travel agent 3-1 issues a ticket to a customer 4-1-1. (Step S21) Next, the ticket reservation is reported to the GDS 5 (Step S22,), which subsequently reports reservation information to the intermediate agent 2 (Step S23), and reports the ticket number to the airline 1 and the accounting agent 6. (Step S24). The ticket number notification is entered in the inventory 7. (Step 25)

Once ARC (or some other intermediary agent) has paid the airline (Step S26), the inventory 7 can be updated, for example, by the airline (FIG. 10) or the accounting agent (FIG. 11, Step S27) so that the particular ticket is no longer maintained in the inventory 7 as an outstanding ticket. After determining which tickets are outstanding (Step 28), a list of outstanding tickets is generated (Step S29), so that the airline 1 can determine whether payment has been made at any time.

While the present invention is described in the foregoing exemplary embodiments as pertaining to the airline industry, the present invention is not limited thereto. For example, the present invention may be applied to ticketing and reservation systems for other modes of transportation including (but not limited to) bus, train, and the like. Additionally, aspects of the invention may apply to non-transportation ticketing. Also, while ARC is described to be one example of the intermediary agent, the present invention is not limited to the use of ARC as the intermediary agent, and any other agent may be substituted therein. Alternatively, the airlines may also choose to collect or issue any associated fees or debit memos directly, instead of using the intermediary agent.

It will be apparent to those skilled in the art that various modifications and variations can be made to the described illustrative, non-limiting embodiments of the present invention without departing from the spirit or scope of the invention. For example, the travel agent could be a personal travel agent located in a travel office or a web-based travel agent. Thus, it is intended that the present invention cover all modifications and variations of this invention consistent with the scope of the appended claims and their equivalents.

What is claimed is:

1. A method of purchasing a travel ticket from a travel agent, comprising:
   issuing the travel ticket by the travel agent to a customer;
   reporting the issuance of the travel ticket externally and by the following day after the issuance of the ticket, the reporting occurring via a cormputer and an electronic communications device; and
   imposing a penalty in the form of a debit memo for a full value of the travel ticket for a change to the travel ticket made after the reporting.

2. A method of making a reservation with a travel provider for travel by a customer, comprising:
   issuing a travel ticket by a travel agent to the customer;
   reporting the issuance of the travel ticket externally by the following day after the issuance via a computer and an electronic communications device, wherein the time of reporting is dynamically adjusted automatically;
   changing the travel ticket after the issuance of the travel ticket;
   reporting the changing of the travel ticket externally via the computer and the electronic communications device, and if the change occurs after the following day after issuance of the travel ticket; and
   imposing a fee for the changing of the ticket.

3. A computer readable medium containing instructions for issuing a travel ticket, the instructions comprising:
   electronically reporting issuance of the travel ticket externally by the following day after the issuance; and
   imposing a penalty comprising a debit memo for a full value of the travel ticket for changes made to the travel ticket after the reporting.

4. A computer readable medium containing instructions for issuing a travel ticket to a customer, the instructions comprising:
   issuing the travel ticket;
   reporting the issuance of the travel ticket externally and by the following day after the issuance via a computer and an electronic communications device, wherein the reporting is dynamically adjusted automatically;
   changing the travel ticket issued to the customer; and
   collecting a change fee for changing the travel ticket after the reporting of the issuance.

* * * * *